United States Patent [19]

Sakai et al.

[11] Patent Number: 5,721,426
[45] Date of Patent: Feb. 24, 1998

[54] OPTICAL TRANSMITTING/RECEIVING MODULE HAVING COMMUNICATION LINES COUPLED BY A SINGLE LENS

[75] Inventors: Yoshimitsu Sakai, Sapporo; Tatsuro Kunikane; Hironao Hakogi, both of Kawasaki, all of Japan

[73] Assignee: Fujitsu Limited, Kanagawa, Japan

[21] Appl. No.: 831,955

[22] Filed: Apr. 2, 1997

Related U.S. Application Data

[63] Continuation of Ser. No. 555,135, Nov. 8, 1995, abandoned.

[30] Foreign Application Priority Data

Mar. 16, 1995 [JP] Japan .................................. 7-057150

[51] Int. Cl.[6] ......................................................... H01J 5/16
[52] U.S. Cl. .............................. 250/227.11; 250/227.24; 385/33
[58] Field of Search .......................... 250/227.11, 227.24, 250/227.28, 227.3, 231.14; 385/35, 33, 93; 359/131

[56] References Cited

U.S. PATENT DOCUMENTS 4,582,809 4/1986 Block et al. .................... 250/227.11
4,958,902 9/1990 Ito ....................................... 385/33
4,987,297 1/1991 Squin et al. .................... 250/231.14

FOREIGN PATENT DOCUMENTS 3-289826 12/1991 Japan .
4-130307 5/1992 Japan .

Primary Examiner—Que Le
Attorney, Agent, or Firm—Staas & Halsey

[57] ABSTRACT

An optical transmitting/receiving module including a light emitting element, a light receiving element, a transmitting optical communication line for transmitting an optical signal, a receiving optical communication line for receiving an optical signal, and a single aspherical lens for coupling the transmitting light emitted from the light emitting element to the transmitting optical communication line and for coupling the receiving light emergent from the receiving optical communication line to the light receiving element. The light emitting element is arranged so that the center line of a beam of the transmitting light emitted from the light emitting element is inclined with respect to the optical axis of the lens. With this arrangement, the optical transmitting/receiving module can be reduced in size.

18 Claims, 10 Drawing Sheets

OPTICAL TRANSMITTING/RECEIVING MODULE HAVING COMMUNICATION LINES COUPLED BY A SINGLE LENS

This application is a continuation of application Ser. No. 08/555,135, filed Nov. 8, 1995, now abandoned.

BACKGROUND OF THE INVENTION

1. Field of the Invention

The present invention relates to an optical transmitting/receiving module for use in an optical communication device.

2. Description of the Related Art

A conventional optical module for use in an optical communication system is composed of an electrical/optical converter circuit, an optical/electrical converter circuit, a laser diode module, and a photodiode module. The laser diode module is composed of a laser diode (LD), a transmitting optical fiber, and a transmitting lens for coupling a transmitting light from the laser diode to the transmitting optical fiber. The photodiode module is composed of a photodiode (PD), a receiving optical fiber, and a receiving lens for coupling a receiving light from the receiving optical fiber to the photodiode. The laser diode module and the photodiode module are constructed as independent packages. The electrical/optical converter circuit and the optical/electrical converter circuit are sometimes integrated together. In the above configuration, a transmitting system and a receiving system are arranged independently of each other, so that it is difficult to greatly reduce the size of the optical module. As an improvement, there has been developed an optical transmitting/receiving module constructed as a single module by integrating the transmitting system consisting of the laser diode, the transmitting optical fiber, and the transmitting lens with the receiving system consisting of the photodiode, the receiving optical fiber, and the receiving lens. The transmitting lens and the receiving lens are arranged independently of each other, or a tandem lens formed by integrating the transmitting lens and the receiving lens independent of each other is used.

In the above conventional optical transmitting/receiving module using the transmitting lens and the receiving lens arranged independently of each other, adjustment of each of the transmitting lens and the receiving lens is required to increase the optical coupling efficiency between the laser diode and the transmitting optical fiber and the optical coupling efficiency between the photodiode and the receiving optical fiber. Further, also in the above conventional optical transmitting/receiving module using the tandem lens, rotational adjustment of the tandem lens is required. Thus, the number of working steps is large, and there is a limit in size reduction of the optical transmitting/receiving module in view of its configuration. Furthermore, if the components of the optical transmitting/receiving module are merely arranged close to each other in order to reduce the size of the module, a fresh problem of electrical or optical crosstalk may occur.

SUMMARY OF THE INVENTION

It is therefore an object of the present invention to reduce the size of an optical transmitting/receiving module and the number of working steps for adjustment in the module.

It is another object of the present invention to reduce the occurrence of the electrical or optical crosstalk problem in reducing the size of the optical transmitting/receiving module.

In accordance with an aspect of the present invention, there is provided an optical transmitting/receiving module comprising a light emitting element; a light receiving element; a transmitting optical communication line for transmitting an optical signal; a receiving optical communication line for receiving an optical signal; and a single lens for coupling a transmitting light emitted from the light emitting element to the transmitting optical communication line and for coupling a receiving light emergent from the receiving optical communication line to the light receiving element. The lens may be an aspherical convex lens. Further, in this configuration, the light emitting element may be arranged so that the center line of a beam of the transmitting light emitted from the light emitting element is inclined with respect to the optical axis of the lens. Further, the light receiving element may be arranged so that the light receiving surface thereof is inclined with respect to the optical axis of the lens.

According to the present invention, the light emitting element and the transmitting optical communication line are optically coupled together by the single lens, and the light receiving element and the receiving optical communication line are optically coupled together by the single lens. Accordingly, the optical transmitting/receiving module having a combined transmitting and receiving function can be made very compact, and the working step for adjustment of the lens or the like can be eliminated. In the case where the light emitting element and/or the light receiving element may be arranged in the inclined condition with respect to the lens as mentioned above, the size of the lens can be further reduced to thereby allow a further reduction of size of the optical transmitting/receiving module. However, although the use of such a configuration allows the achievement of size reduction of the module, there is a possibility that the space between the light emitting element and the light receiving element may become small to cause a fresh problem of electrical or optical crosstalk. As an example of measures for solving such a problem, a first optical path length from the incident end surface of the transmitting optical communication line to the principal plane of the lens may be set larger than a second optical path length from the emergent end surface of the receiving optical communication line to the principal plane of the lens, thereby making the space between the light emitting element and the light receiving element as large as possible. Accordingly, the occurrence of the above crosstalk problem can be reduced.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
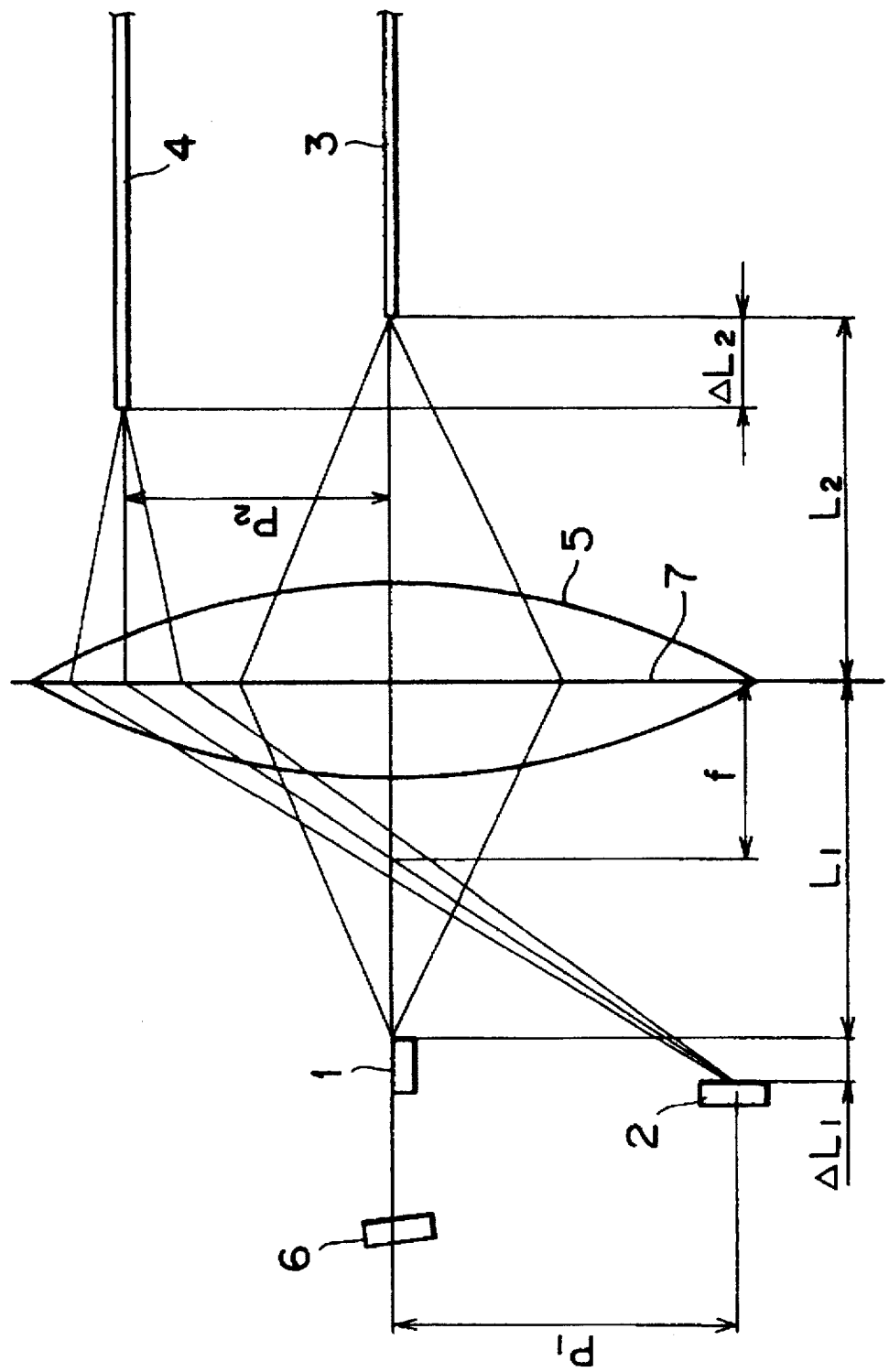
FIG. 1 is a view showing a basic configuration of an optical transmitting/receiving module according to a preferred embodiment of the present invention.
Figure 2:
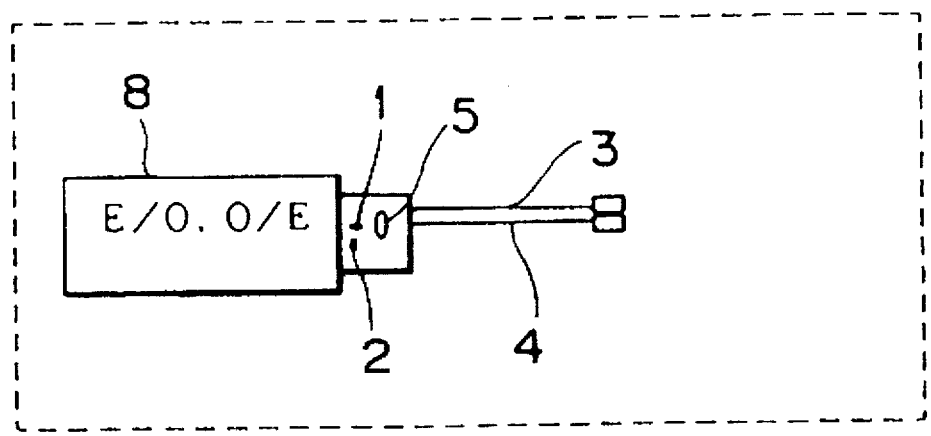
FIG. 2 is a view showing a general configuration of the optical transmitting/receiving module according to the preferred embodiment.

Some preferred embodiments of the present invention will now be described with reference to the drawings. In FIGS. 1 and 2, reference numeral 1 denotes a laser diode (LD) as a light emitting element, and reference numeral 2 denotes a photodiode (PD) as a light receiving element. Reference numeral 3 denotes a transmitting optical fiber as a transmitting optical communication line, and reference numeral 4 denotes a receiving optical fiber as a receiving optical communication line. Reference numeral 5 denotes a single lens for coupling a transmitting light from the laser diode 1 to the transmitting optical fiber 3 and for coupling a receiving light from the receiving optical fiber 4 to the photodiode 2. The lens 5 is an aspherical convex lens. Reference numeral 6 denotes a monitoring photodiode for monitoring the intensity of emergent light from the laser diode 1, and reference numeral 8 denotes an integrated E/O and O/E circuit for converting an electrical signal to an optical signal and for converting an optical signal to an electrical signal. In this preferred embodiment, the laser diode 1 is arranged so that the center line of a beam of emergent light from the laser diode 1 is coincident with the optical axis of the lens 5, and the transmitting optical fiber 3 is arranged so that the axis thereof is coincident with the optical axis of the lens 5. The photodiode 2 is arranged at a position spaced from the optical axis of the lens 5, and the receiving optical fiber 4 is arranged so that the axis thereof is parallel to the axis of the transmitting optical fiber 3 and at such a position as to optically correspond to the photodiode 2 with the lens 5 interposed therebetween. The photodiode 2 is oriented so that the light receiving surface thereof is perpendicular to the optical axis of the lens 5.

In this manner, all the components are mounted and arranged in a common package, and the single lens 5 is used to effect optical couplings between the laser diode 1 and the transmitting optical fiber 3 and between the photodiode 2 and the receiving optical fiber 4. Accordingly, the optical transmitting/receiving module can be assembled compactly and simply. Further, no adjustment of a rotational direction of the lens 5 is required. Thus, the number of working steps for assembly and adjustment can be reduced. However, the use of such a single-lens system necessarily reduces the space between the laser diode 1 and the photodiode 2, causing a serious problem of electrical or optical crosstalk. As measures for reducing the crosstalk, it is considered to space the laser diode 1 and the photodiode 2 from each other as apart as possible, or additionally locate a shield of metal or the like between the laser diode 1 and the photodiode 2.

The measures for widening the space between the laser diode 1 and the photodiode 2 will now be considered. In FIG. 1, let $P_1$ denote the space (element pitch) between the laser diode 1 and the photodiode 2; $P_2$ denote the space (fiber pitch) between the transmitting optical fiber 2 and the receiving optical fiber 4; $\Delta L_1$ denote the optical path difference between the optical path length from the light emitting surface of the laser diode 1 to a principal plane 7 of the lens 5 (i.e., a plane perpendicularly intersecting the optical axis of the lens 5 at the center of the lens 5) and the optical path length from the light receiving surface of the photodiode 2 to the principal plane 7 of the lens 5; $\Delta L_2$ denote the optical path difference between the optical path length from the incident end surface of the transmitting optical fiber 3 to the principal plane 7 of the lens 5 and the optical path length from the emergent end surface of the receiving optical fiber 4 to the principal plane 7 of the lens 5; f denote the focal length of the lens 5; $L_1$ denote the optical path length from the light emitting surface of the laser diode 1 to the principal plane 7 of the lens 5; and $L_2$ denote the optical path length from the incident end surface of the transmitting optical fiber 3 to the principal plane 7 of the lens 5. In this case, the positional relation between the components of the optical system (laser diode 1, photodiode 2, transmitting optical fiber 3, receiving optical fiber 4, and lens 5) is based on Eqs. (1) and (2).

$$1/(L_1+\Delta L_1)+1/(L_2-\Delta L_2)=1/f \qquad (1)$$

$$(P_1+P_2)/(L_1+\Delta L_1)=P_2/f \qquad (2)$$

From Eq. (2), the element pitch $P_1$ is expressed as follows:

$$P_1=P_2\times(L_1+\Delta L_1-f)/f \qquad (2)'$$

From Eqs. (1) and (2), the element pitch $P_1$ is expressed as follows:

$$P_1=(P_2/f)\times(1/\{(1/f)-[1/(L_2-\Delta L_2)]\}) \qquad (3)$$

To increase the element pitch P1, the following factors are considered from Eq. (2)'.

(A) Increasing the fiber pitch $P_2$ (B) Decreasing the focal length f of the lens 5

(c) Increasing the optical path difference $\Delta L_1$.

Alternatively, increasing the optical path difference $\Delta L_2$

Further, the effective diameter $\phi$ of the lens 5 (i.e., the maximum diameter allowing the function of the lens 5) and the numeral aperture N.A. [fiber] of emergent light from the optical fiber are related as follows:

$$\phi=2\times\{P_2+\text{N.A. [fiber]}\times(L_2-\Delta L_2)\} \qquad (4)$$

It is understood from Eq. (4) that the fiber pitch $P_2$ as the above factor (A) is substantially proportional to the effective diameter $\phi$ of the lens 5. Accordingly, the effective diameter $\phi$ of the lens 5 (that is, the size of the lens 5 itself) must be increased to increase the fiber pitch $P_2$. However, in consideration of size reduction of the module, the lens 5 is preferably made small. Therefore, the fiber pitch $P_2$ cannot be so increased.

The focal length f of the lens 5 as the above factor (B) is determined by the shape of the lens 5 and the refractive index n of the material forming the lens 5. Accordingly, a decrease in the focal length f may be achieved by reducing the radius of curvature, R, of the lens 5 and selecting a material having a large refractive index n as the material of the lens 5. However, the decrease in the focal length f results in an increase in incident angle $\theta_1$ of light entering the photodiode 2 (i.e., an angle defined between the center line of the beam of incident light to the photodiode 2 and a line perpendicular to the light receiving surface). The incident angle $\theta_1$ is expressed as follows:

$$\theta_1 = \tan^{-1}(P_2/f) \tag{5}$$

The increase in the incident angle $\theta_1$ causes an elliptical shape of the beam of light incident on the light receiving surface of the photodiode 2. Accordingly, it is necessary to provide a close tolerance of the photodiode 2 along the major axis of the elliptical shape. In these circumstances, this preferred embodiment follows the above factor (C) to set the optical path length $L_2$ from the incident end surface of the transmitting optical fiber 3 to the principal plane 7 of the lens 5 larger by the optical path difference $\Delta L_2$ than the optical path length from the emergent end surface of the receiving optical fiber 4 to the principal plane 7 of the lens 5, and also set the optical path length from the light receiving surface of the photodiode 2 to the principal plane 7 of the lens 5 larger by the optical path difference $\Delta L_1$ than the optical path length $L_1$ from the light emitting surface of the laser diode 1 to the principal plane 7 of the lens 5 as shown in FIG. 1. With this arrangement, the element pitch $P_1$ as the space between the laser diode 1 and the photodiode 2 can be increased to thereby reduce the occurrence of the crosstalk problem.

Figure 3:
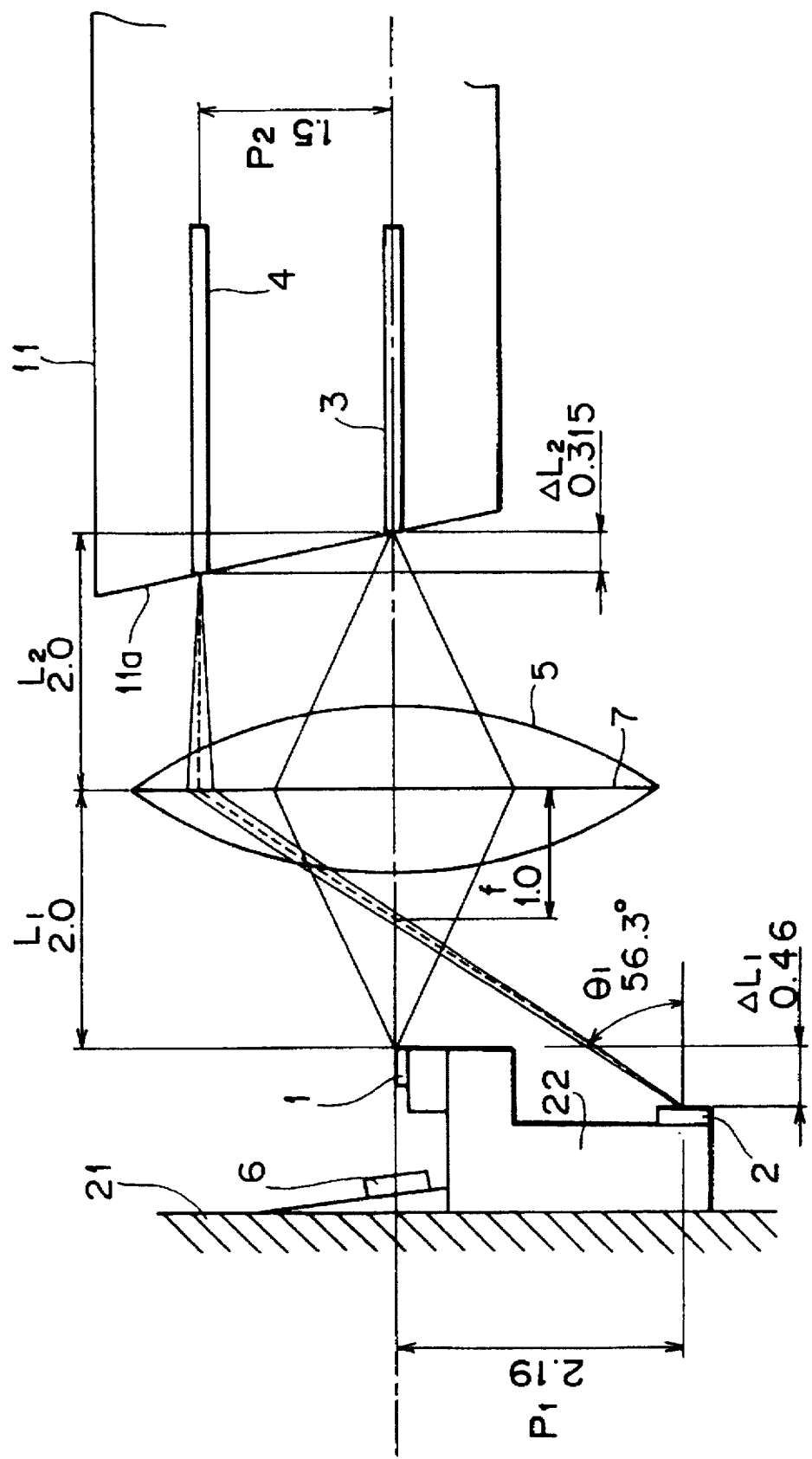
FIG. 3 is a view showing a specific embodiment of the optical transmitting/receiving module shown in FIG. 1.

A specific embodiment for ensuring the optical path difference $\Delta L_2$ is shown in FIG. 3. As shown in FIG. 3, the transmitting optical fiber 3 and the receiving optical fiber 4 parallel to each other are mounted in a single ferrule 11 and thereby integrated together. Furthermore, an incident/emergent end surface 11a of the ferrule 11 is formed by polishing to become an inclined surface inclined at a given angle with respect to the axes of the optical fibers 3 and 4. In this case, however, a critical value of the angle of inclination of the incident/emergent end surface 11a is 41.8°, at which total reflection occurs. Therefore, the inclination angle must be set less than or equal to 41.8°. The configuration shown in FIG. 3 is based on Eqs. (1) and (2) wherein, for example, the lens 5 is arranged at such a position that $L_1/L_2$ is equal to 1 under the conditions that the focal length f of the lens 5 is set to 1.0 mm, the fiber pitch $P_2$ is set to 1.5 mm, and the optical path difference $\Delta L_2$ is set to 0.315 mm (the optical path difference created in the case of setting the inclination angle of the end surface 11a of the ferrule 11 to 8°). In this case, the element pitch $P_1$ becomes 2.19 mm.

The transmitting light emitted from the laser diode 1 is coupled to the transmitting optical fiber 3 in such a manner that the center line of the light beam passes through the center of the lens 5. Further, the receiving light emerging from the receiving optical fiber 4 is received by the photodiode 2 at an incident angle $\theta_1$ of 56.3° obtained from Eq. (5) in such a manner that the center line of the light beam passes through a point spaced by the fiber pitch $P_2$ from the center of the lens 5. In this case, the required effective diameter $\phi$ of the lens 5 becomes 3.34 mm or more from Eq. (4) on the assumption that the numerical aperture N.A.[fiber] of the emergent light from the receiving optical fiber 4 is set to 0.1. In FIG. 3, reference numeral 21 denotes a board, and reference numeral 22 denotes a base member for fixing the laser diode 1 and the photodiode 2 thereon. Further, although not shown, the lens 5 is fixed to the board 21 by a supporting member.

While there has been described a basic configuration of the optical transmitting/receiving module according to the present invention, an improvement in the basic configuration will now be described.

(a) Configuration for further reducing the effective diameter $\phi$ of the lens 5

Figure 4:
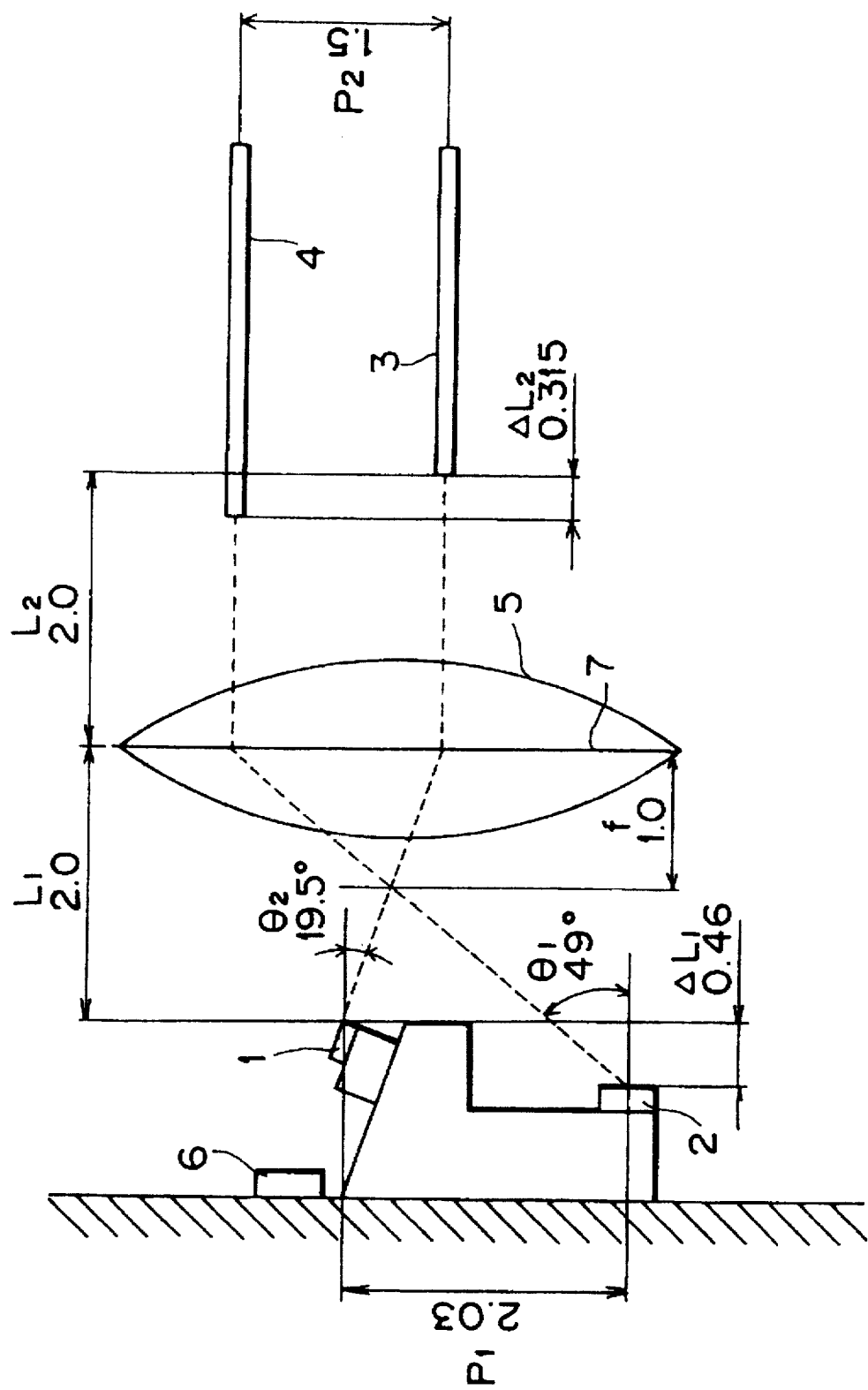
FIG. 4 is a view showing a configuration improved in arrangement of an LD in the optical transmitting/receiving module according to the preferred embodiment.

In contrast with the configuration shown in FIG. 1 or 3 wherein the laser diode 1 is arranged so that the center line of the light beam emitted therefrom is coincident with the optical axis of the lens 5, the configuration shown in FIG. 4 is characterized in that the laser diode 1 is arranged so that the center line of the light beam emitted therefrom is inclined with respect to the optical axis of the lens 5 ($\theta_2 = 19.5°$).

The transmitting light emitted from the laser diode 1 passes through a focal point of the lens 5 (determined by the focal length f) and is then incident on the principal plane 7 at a position vertically offset by $-f \cdot \tan \theta_2$ from the center of the lens 5. Then, the light beam is converted in direction of travel into a beam parallel to the optical axis of the lens 5, and then enters the transmitting optical fiber 3. On the other hand, the receiving light emergent from the receiving optical fiber 4 is incident on the principal plane 7 at a position vertically offset by $P_2 - f \cdot \tan \theta_2$ from the center of the lens 5, and then enters the photodiode 2 at an incident angle $\theta_1$ expressed as follows:

$$\theta_1 = \tan^{-1}\{(P_2 - f \cdot \tan \theta_2)/f\} \tag{6}$$

In this case, the required effective diameter $\phi$ of the lens 5 is expressed as follows:

$$\phi/2 = L_1 \times N.A.[LD] + f \cdot \sin \theta_2 = (P_2 - f \cdot \sin \theta_2) + (L_2 - \Delta L_2) \times N.A.[fiber]$$

where N.A.[LD] denotes a numerical aperture of light emitted from the laser diode 1. Accordingly, when N.A.[LD] is equal to 0.5 (divergent angle of 30°) and $\theta_2$ is equal to 19.5°, the effective diameter $\phi$ becomes minimum. Thus, the required effective diameter $\phi$ is 2.8 mm or more. Further, the incident angle $\theta_1$ of the light beam entering the photodiode 2 becomes 49° from Eq. (6). With this arrangement, the effective diameter $\phi$ of the lens 5 can be reduced. Accordingly, a small lens can be used to thereby realize the size reduction of the optical transmitting/receiving module.

Further, although not shown, the effective diameter $\phi$ of the lens 5 can be reduced also by the following configuration. In general, the angle of divergence of the light beam emitted from the laser diode 1 in a direction parallel to an active layer of the laser diode 1 is smaller than that in a direction perpendicular to the active layer. Accordingly, the laser diode 1 is arranged so that the direction in which the angle of divergence of the light beam emitted from the laser diode 1 is smaller is coincident with the direction of a line connecting the center lines of the beams of the transmitting light and the receiving light on the principal plane 7 of the lens 5, thereby reducing the effective diameter $\phi$ of the lens 5. More specifically, the laser diode 1 is mounted so that its active layer becomes parallel to the plane of a sheet of FIG. 3, that is, so that the active layer is rotated 90° from a usual mounting position.

(b) Configuration for reducing the incident angle $\theta_1$ on the photodiode 2

Figure 5:
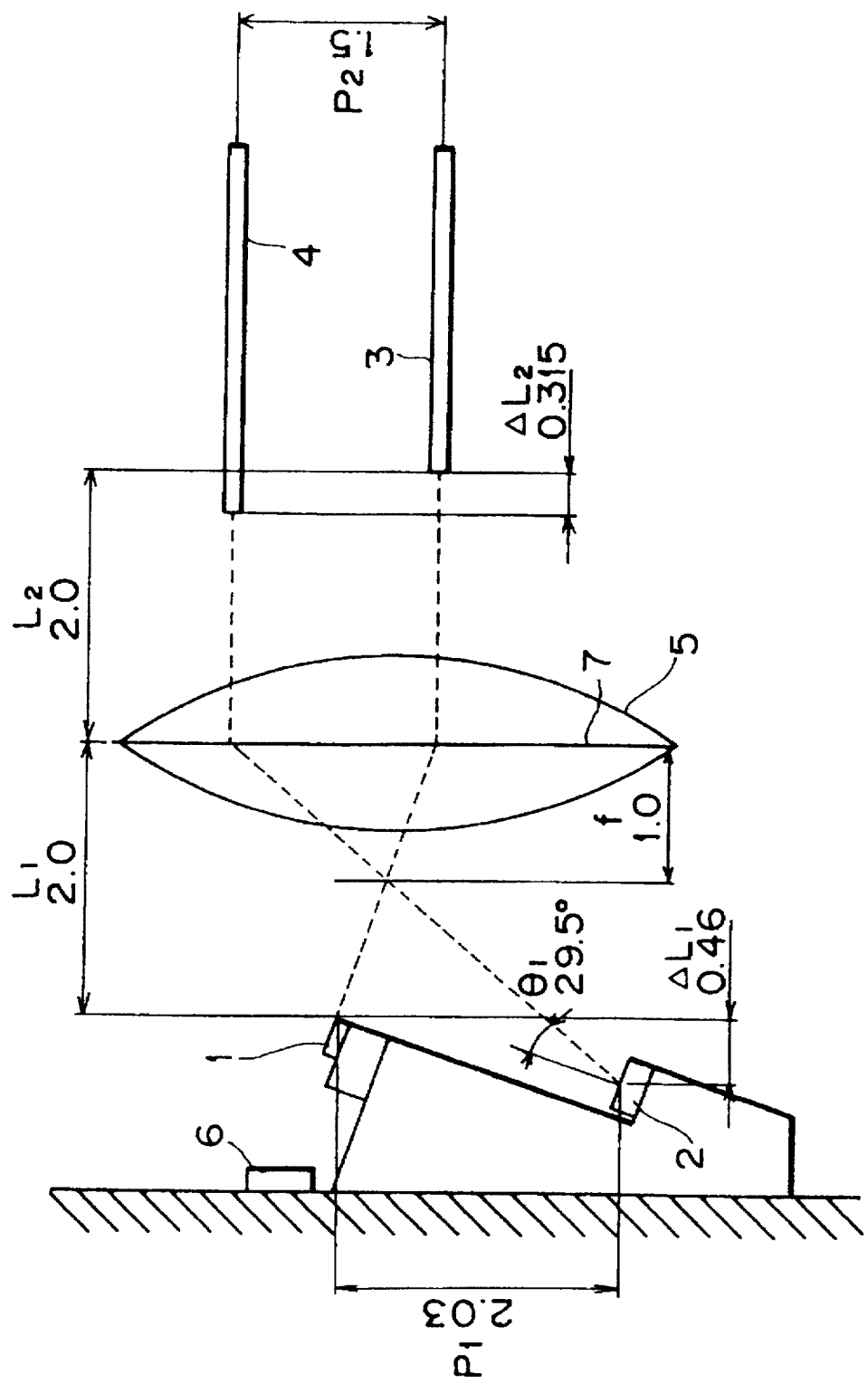
FIG. 5 is a view showing a configuration improved in arrangement of the LD and a PD in the optical transmitting/receiving module according to the preferred embodiment.

In FIG. 4, the photodiode 2 is arranged so that the light receiving surface thereof is parallel to the principal plane 7 of the lens 5. In contrast therewith, the photodiode 2 may be arranged so that the light receiving surface thereof is inclined with respect to the principal plane 7 of the lens 5, thereby reducing the incident angle $\theta_1$ of the light beam incident on the photodiode 2. The use of such a configuration makes it possible to prevent that the shape of the light beam incident on the light receiving surface of the photodiode 2 becomes elliptical. As a result, the tolerance (positional accuracy) of the photodiode 2 can be made loose. In particular, as shown in FIG. 5, the photodiode 2 is arranged so that the light receiving surface thereof is perpendicular to the light emitting surface of the laser diode 1, that is, the light receiving surface of the photodiode 2 is parallel to the center line of the light beam emitted from the laser diode 1. With this arrangement, the incident angle $\theta_1$ can be reduced. Additionally, the mounting direction of the laser diode 1 becomes the same as that of the photodiode 2, thereby allowing a decrease in number of working steps in the manufacture of the module. In the case of applying this configuration to the configuration shown in FIG. 4, the incident angle $\theta_1$ of the light beam incident on the photodiode 2 becomes 29.5°.

Figure 6:
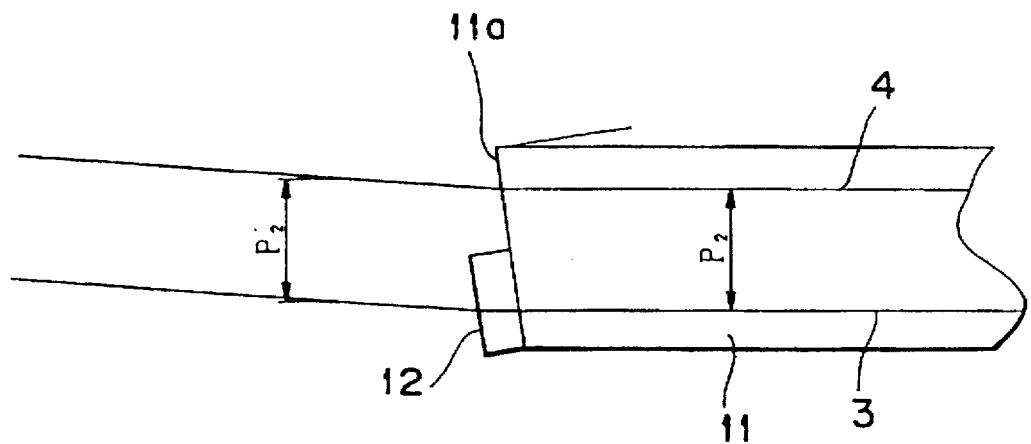
FIG. 6 is a view showing a configuration improved in arrangement near a incident/emergent portion of optical fibers in the optical transmitting/receiving module according to the preferred embodiment.
Figure 7:
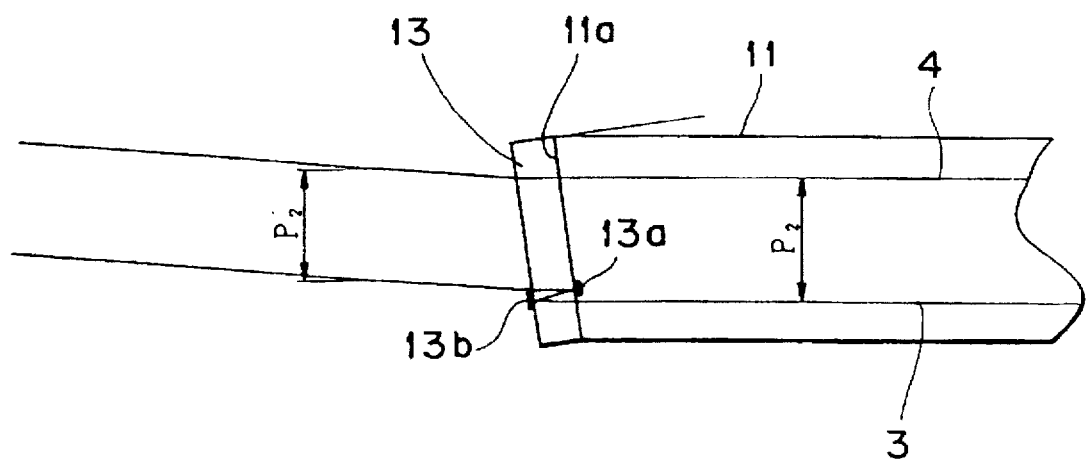
FIG. 7 is a view showing another configuration improved in arrangement near the incident/emergent portion of optical fibers in the optical transmitting/receiving module according to the preferred embodiment.
Figure 8:
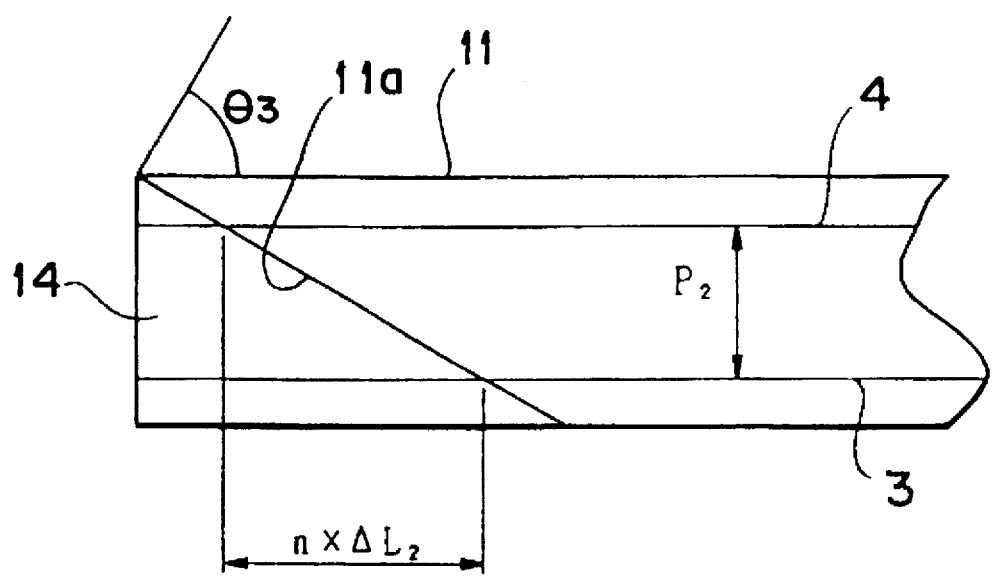
FIG. 8 is a view showing still another configuration improved in arrangement near the incident/emergent portion of optical fibers in the optical transmitting/receiving module according to the preferred embodiment.

(c) Configuration for increasing the optical path difference $\Delta L_2$ to increase the element pitch $P_1$ As shown in FIG. 6, a glass board 12 is bonded to the incident/emergent end surface 11a of the ferrule 11 in which the transmitting optical fiber 3 and the receiving optical fiber 4 are mounted, at a position corresponding to the transmitting optical fiber 3. Alternatively, as shown in FIG. 7, a glass board 13 having opposite surfaces suitably formed with total reflection films 13a and 13b is bonded to the incident/emergent end surface 11a of the ferrule 11 in which the transmitting optical fiber 3 and the receiving optical fiber 4 are mounted. In the latter case, the receiving light emergent from the receiving optical fiber 4 is transmitted through the glass board 13, whereas the transmitting light from the laser diode 1 enters the glass board 13 and is then reflected on the total reflection film 13a, thereafter being further reflected on the total reflection film 13b to enter the transmitting optical fiber 3. The use of the configuration shown in FIG. 6 or FIG. 7 allows an increase in the optical path difference $\Delta L_2$. Accordingly, the space $P_1$ between the laser diode 1 and the photodiode 2 can be increased to thereby reduce the occurrence of the crosstalk problem. As another configuration shown in FIG. 8, a triangular prism 14 so formed as to complement a cutout portion of the ferrule 11 as removed by polishing may be arranged on the inclined incident/emergent end surface 11a of the ferrule 11. In this case, the optical path difference $\Delta L_2$ is expressed as follows:

$$\Delta L_2 = (P_2/n) \cdot \tan^{-1} \theta_3$$

where $P_2$ denotes the fiber pitch, $\theta_3$ denotes an angle of inclination of the incident/emergent end surface 11a of the ferrule 11 with respect to the axes of the optical fibers 3 and 4, and n denotes the refractive index of the triangular prism 14. Accordingly, the optical path difference $\Delta L_2$ can be arbitrarily increased by suitably selecting the refractive index n of the triangular prism 14. With this arrangement, the optical path difference $\Delta L_2$ can be increased to thereby increase the space $P_1$ between the laser diode 1 and the photodiode 2, thus reducing the occurrence of the crosstalk problem.

Figure 9:
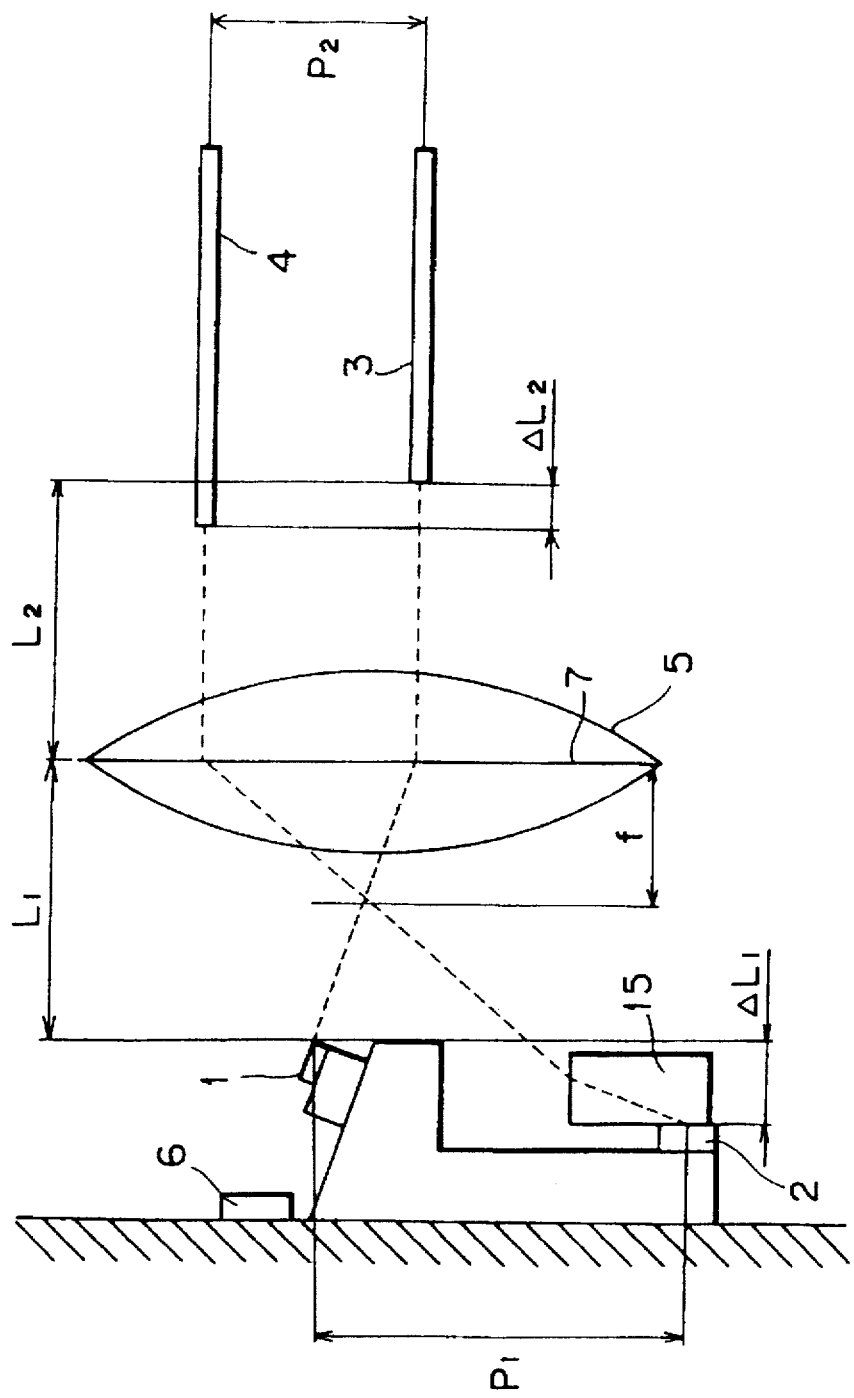
FIG. 9 is a view showing a configuration improved in arrangement near the PD in the optical transmitting/receiving module according to the preferred embodiment.
Figure 10:
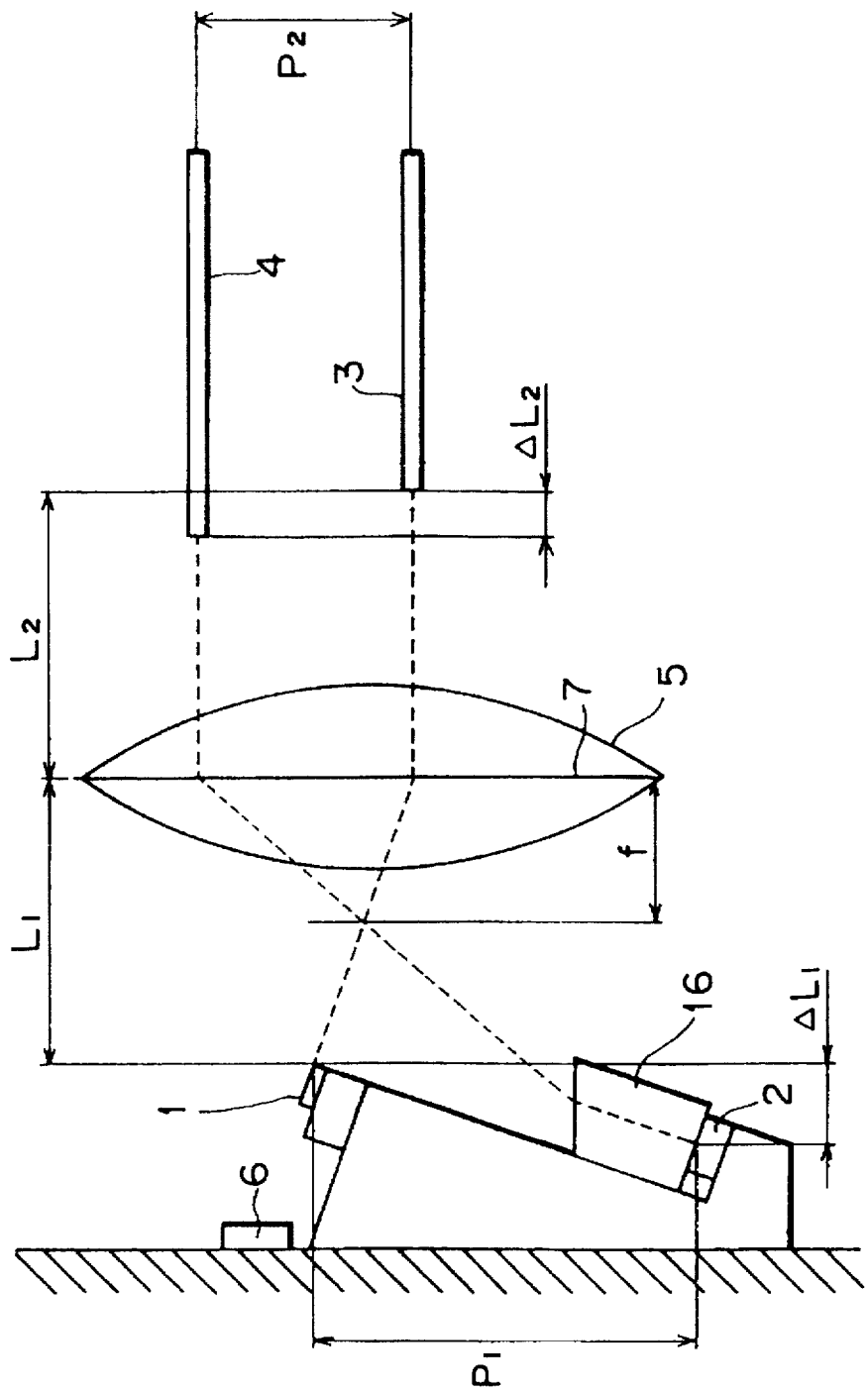
FIG. 10 is a view showing another configuration improved in arrangement near the PD in the optical transmitting/receiving module according to the preferred embodiment.
Figure 11:
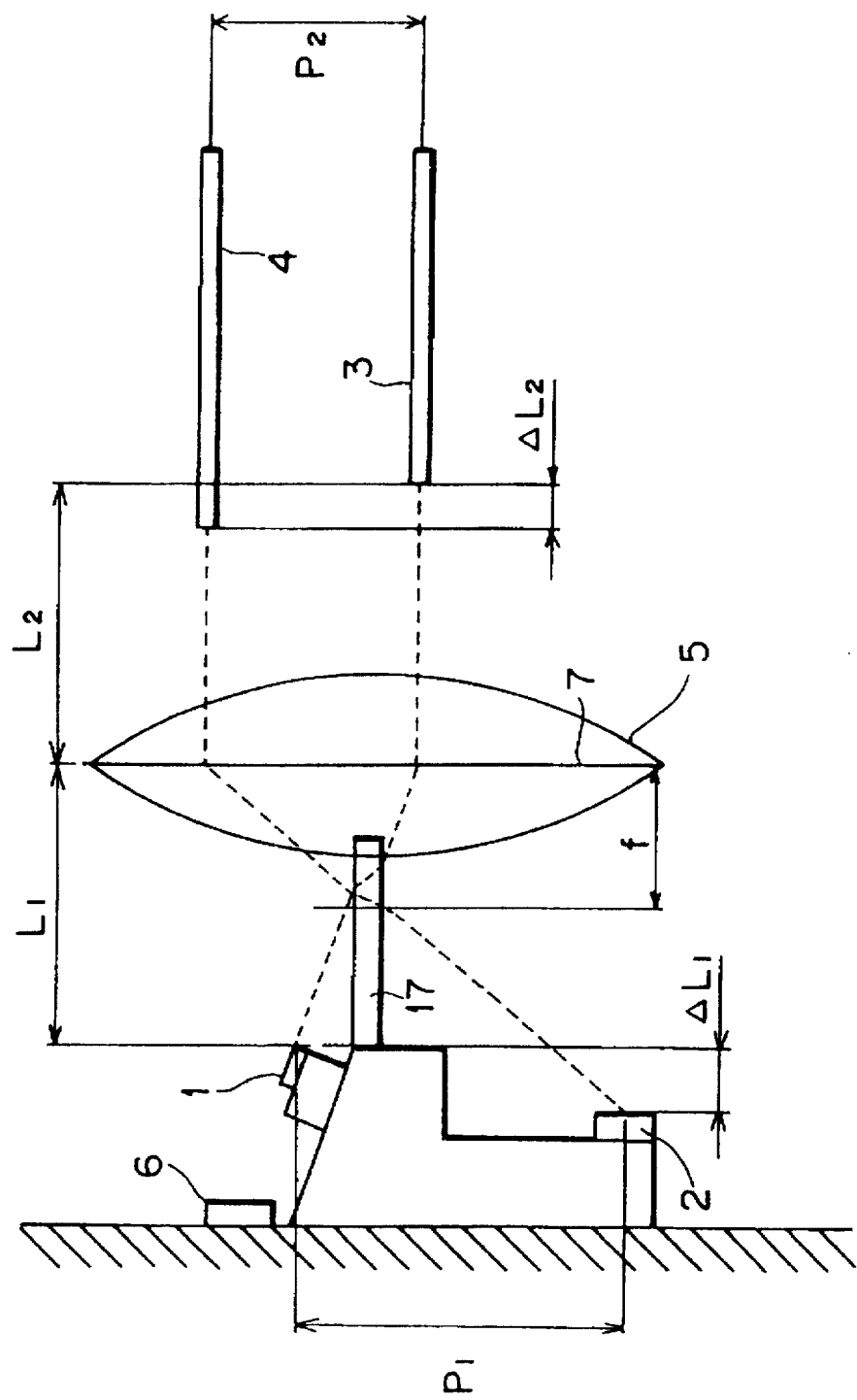
FIG. 11 is a view showing a configuration improved in arrangement near the LD and the PD in the optical transmitting/receiving module according to the preferred embodiment.

(d) Configuration for increasing the optical path difference $\Delta L_1$ to increase the element pitch $P_1$ FIG. 9 shows a modification of the configuration shown in FIG. 4. A glass board 15 is provided on the light receiving surface of the photodiode 2. The receiving light emergent from the receiving optical fiber 4 through the lens 5 is first incident on a side surface of the glass board 15, and is then incident on the light receiving surface of the photodiode 2 by utilizing refraction of light. Thus, the optical path difference $\Delta L_1$ can be increased. FIG. 10 shows a modification of the configuration shown in FIG. 5. A polygonal prism 16 is provided on the light receiving surface of the photodiode 2. The receiving light emergent from the receiving optical fiber 4 through the lens 5 is first incident on a surface of the polygonal prism 16 as shown in FIG. 10, and is then incident on the light receiving surface of the photodiode 2 by utilizing refraction of light. Thus, the optical path difference $\Delta L_1$ can be increased. FIG. 11 shows another modification of the configuration shown in FIG. 4. A single glass board 17 is provided on the optical paths of the receiving light emergent from the receiving optical fiber 4 through the lens 5 and the transmitting light emitted from the laser diode 1 toward the lens 5. Thus, the optical path difference $\Delta L_1$ can be increased by utilizing refraction of light. The use of the configuration shown in FIG. 9, 10, or 11 allows an increase in the optical path difference $\Delta L_1$. Accordingly, the space $P_1$ between the laser diode 1 and the photodiode 2 can be increased to thereby reduce the occurrence of the crosstalk problem.

As described above, according to the present invention, it is possible to provide a very small optical transmitting/receiving module configured as one module having a combined light transmitting and light receiving function. Further, it is possible to provide an optical transmitting/receiving module which can reduce the occurrence of the crosstalk problem in achieving the size reduction of the module.

What is claimed is:

1. An optical transmitting/receiving module comprising:

a light emitting element;

a light receiving element;

a base member to fix said light receiving element and said light emitting element thereon in a predetermined positional relationship;

a transmitting optical communication line having a first end to be optically connected to said light emitting element;

a receiving optical communication line having a second end to be optically connected to said light receiving element; and a single lens having an optical axis substantially coincident with said light emitting element, said light receiving element being positioned so as to be deviated from said optical axis, said predetermined positional relationship being set in such a manner that a transmitting light emitted from said light emitting element is coupled to said first end by said lens and a receiving light emergent from said second end is coupled to said light receiving element by said lens.

2. An optical transmitting/receiving module according to claim 1, wherein said lens comprises an aspherical lens.

3. An optical transmitting/receiving module according to claim 1, wherein said light emitting element is arranged so that a center line of a beam of said transmitting light emitted from said light emitting element is inclined with respect to the optical axis of said lens.

4. An optical transmitting/receiving module according to claim 1, wherein said light emitting element is arranged so that a direction in parallel to an active layer of said light emitting element is coincident with a direction of a line connecting a center line of a beam of said transmitting light emitted from said light emitting element with a center line of a beam of said receiving light emergent from said receiving optical communication line on a principal plane of said lens.

5. An optical transmitting/receiving module according to claim 1, wherein a first optical path length from the first end of said transmitting optical communication line to a principal plane of said lens is set larger than a second optical path length from the second end of said receiving optical communication line to said principal plane of said lens.

6. An optical transmitting/receiving module according to claim 5, wherein:
   said transmitting optical communication line and said receiving optical communication line comprise a transmitting optical fiber and a receiving optical fiber, respectively;
   said transmitting optical fiber and said receiving optical fiber are mounted in a single ferrule and integrated together; and
   an incident/emergent end surface of said ferrule is formed by polishing as an inclined surface inclined with respect to axes of said transmitting optical fiber and said receiving optical fiber.

7. An optical transmitting/receiving module according to claim 6, wherein a glass board is bonded on said incident/emergent end surface of said ferrule at a position corresponding to said transmitting optical fiber.

8. An optical transmitting/receiving module according to claim 6, wherein a glass board is bonded to said incident/emergent end surface of said ferrule, and a pair of light reflecting films are formed on opposite surfaces of said glass board at such a position that said transmitting light emitted from said light emitting element is reflected plural times in said glass board and thereafter enters said transmitting optical fiber.

9. An optical transmitting/receiving module according to claim 6, wherein a triangular prism having a predetermined refractive index and a shape o as to complement a cutout portion of said ferrule removed by said polishing is provided on said incident/emergent end surface of said ferrule.

10. An optical transmitting/receiving module according to claim 3, wherein said light receiving element is arranged so that a light receiving surface of said light receiving element is inclined with respect to said optical axis of said lens.

11. An optical transmitting/receiving module according to claim 10, wherein said light receiving element is arranged so that said light receiving surface of said light receiving element is parallel to said center line of said beam of said transmitting light emitted from said light emitting element.

12. An optical transmitting/receiving module according to claim 1, wherein a first optical path length from said light receiving element to a principal plane of said lens is set larger than a second optical path length from said light emitting element to said principal plane of said lens.

13. An optical transmitting/receiving module according to claim 12, wherein a glass board is provided on a light receiving surface of said light receiving element, and said receiving light is passed through said glass board to enter said light receiving element, thereby increasing a difference between said first optical path length and said second optical path length.

14. An optical transmitting/receiving module according to claim 12, wherein a polygonal prism is provided on a light receiving surface of said light receiving element, and said receiving light is passed through said polygonal prism to enter said light receiving element, thereby increasing a difference between said first optical path length and said second optical path length.

15. An optical transmitting/receiving module according to claim 12, wherein a glass board is provided on optical paths of said transmitting light and said receiving light between said lens and a portion of said light receiving element and said light emitting element, and said receiving light is passed through said glass board to enter said light receiving element, thereby increasing a difference between said first optical path length and said second optical path length.

16. An optical transmitting/receiving module according to claim 1, wherein:
   said transmitting optical communication line and said receiving optical communication line comprise a transmitting optical fiber and a receiving optical fiber, respectively; and
   said transmitting optical fiber and said receiving optical fiber are substantially parallel to each other in the vicinity of said first and second ends.

17. An optical transmitting/receiving module according to claim 1, wherein said light emitting element is a laser.

18. An optical transmitting/receiving module according to claim 1, wherein said light receiving element is a photodiode.

* * * * *